(12) United States Patent
Bergholz, Jr. et al.

(10) Patent No.: US 9,175,569 B2
(45) Date of Patent: Nov. 3, 2015

(54) TURBINE AIRFOIL TRAILING EDGE COOLING SLOTS

(75) Inventors: Robert Frederick Bergholz, Jr., Loveland, OH (US); Daniel Lee Durstock, Fort Wright, KY (US)

(73) Assignee: General Electric Company, Schenectady, NY (US)

( * ) Notice: Subject to any disclaimer, the term of this patent is extended or adjusted under 35 U.S.C. 154(b) by 663 days.

(21) Appl. No.: 13/435,302

(22) Filed: Mar. 30, 2012

(65) Prior Publication Data
US 2013/0259645 A1   Oct. 3, 2013

(51) Int. Cl.
*F01D 5/18* (2006.01)
*F01D 9/02* (2006.01)

(52) U.S. Cl.
CPC *F01D 5/18* (2013.01); *F01D 5/186* (2013.01); *F01D 5/187* (2013.01); *F01D 9/02* (2013.01); F05D 2240/304 (2013.01); Y02T 50/673 (2013.01); Y02T 50/676 (2013.01)

(58) Field of Classification Search
CPC ........... F01D 5/18; F01D 5/187; F01D 5/186; F01D 9/02; F05D 2240/304; F05D 2240/122
USPC ............ 415/115; 416/96 R, 96 A, 97 R, 97 A
See application file for complete search history.

(56) References Cited

U.S. PATENT DOCUMENTS

| | | | |
|---|---|---|---|
| 4,303,374 A | 12/1981 | Braddy | |
| 4,601,638 A | 7/1986 | Hill et al. | |
| 4,684,323 A * | 8/1987 | Field | 416/97 R |
| 5,368,441 A * | 11/1994 | Sylvestro et al. | 416/97 R |
| 5,503,529 A | 4/1996 | Anselmi et al. | |
| 5,931,638 A | 8/1999 | Krause et al. | |
| 6,402,470 B1 | 6/2002 | Kvasnak et al. | |
| 6,612,811 B2 | 9/2003 | Morgan et al. | |
| 6,616,406 B2 | 9/2003 | Liang | |

(Continued)

FOREIGN PATENT DOCUMENTS

| | | |
|---|---|---|
| EP | 1213442 A1 | 6/2002 |
| GB | 2036884 A | 7/1980 |
| WO | 2009109462 A1 | 9/2009 |

OTHER PUBLICATIONS

Search Report from PCT/US2013/030639 dated Dec. 4, 2013.

(Continued)

*Primary Examiner* — Dwayne J White
*Assistant Examiner* — William Grigos
(74) *Attorney, Agent, or Firm* — General Electric Company; William Scott Andes

(57) ABSTRACT

A turbine airfoil includes pressure and suction sidewalls extending along a span from a base to a tip. Spanwise spaced apart trailing edge cooling holes in the pressure sidewall end at corresponding spanwise spaced apart trailing edge cooling slots extending chordally substantially to the trailing edge. Each cooling hole includes in downstream serial cooling flow relationship, a curved inlet, a constant area and constant width metering section, and a spanwise diverging section leading into the trailing edge cooling slot, and a spanwise height substantially greater than a hole width through the cooling hole. A pressure sidewall surface of the pressure sidewall may be planar through the metering and diverging sections. The width may be constant through the metering and diverging sections. A raised floor may include a flat up ramp in the diverging section, a flat down ramp in the slot.

41 Claims, 7 Drawing Sheets

(56) References Cited

U.S. PATENT DOCUMENTS

| | | | |
|---|---|---|---|
| 6,969,230 B2 * | 11/2005 | Shi et al. | 415/115 |
| 7,246,999 B2 | 7/2007 | Manning et al. | |
| 7,371,048 B2 | 5/2008 | Downs et al. | |
| 7,503,749 B2 * | 3/2009 | Lee et al. | 416/97 R |
| 7,575,414 B2 * | 8/2009 | Lee | 415/115 |
| 7,806,659 B1 | 10/2010 | Liang | |
| 8,079,813 B2 | 12/2011 | Liang | |
| 8,096,771 B2 | 1/2012 | Liang | |
| 2003/0044275 A1 | 3/2003 | Leeke et al. | |
| 2010/0074763 A1 * | 3/2010 | Liang | 416/97 R |
| 2013/0205786 A1 | 8/2013 | Kohli et al. | |
| 2013/0205787 A1 | 8/2013 | Zelesky et al. | |
| 2013/0205790 A1 | 8/2013 | Xu et al. | |
| 2013/0205791 A1 | 8/2013 | Mongillo, Jr. et al. | |
| 2013/0205792 A1 | 8/2013 | Gleiner et al. | |
| 2013/0205793 A1 | 8/2013 | Xu | |
| 2013/0205794 A1 | 8/2013 | Xu | |
| 2013/0205801 A1 | 8/2013 | Xu et al. | |
| 2013/0205802 A1 | 8/2013 | Levasseur et al. | |
| 2013/0205803 A1 | 8/2013 | Xu | |
| 2013/0206733 A1 | 8/2013 | Levasseur et al. | |
| 2013/0209227 A1 | 8/2013 | Xu | |
| 2013/0209228 A1 | 8/2013 | Xu | |
| 2013/0209229 A1 | 8/2013 | Xu et al. | |
| 2013/0209233 A1 | 8/2013 | Xu et al. | |
| 2013/0209234 A1 | 8/2013 | Xu | |
| 2013/0209235 A1 | 8/2013 | Xu | |
| 2013/0209236 A1 | 8/2013 | Xu | |
| 2013/0209269 A1 | 8/2013 | Gleiner et al. | |

OTHER PUBLICATIONS

Unofficial English Translation of Chinese Office Action issued in connection with corresponding CN Application No. 201380017496.7 on May 6, 2015.

* cited by examiner

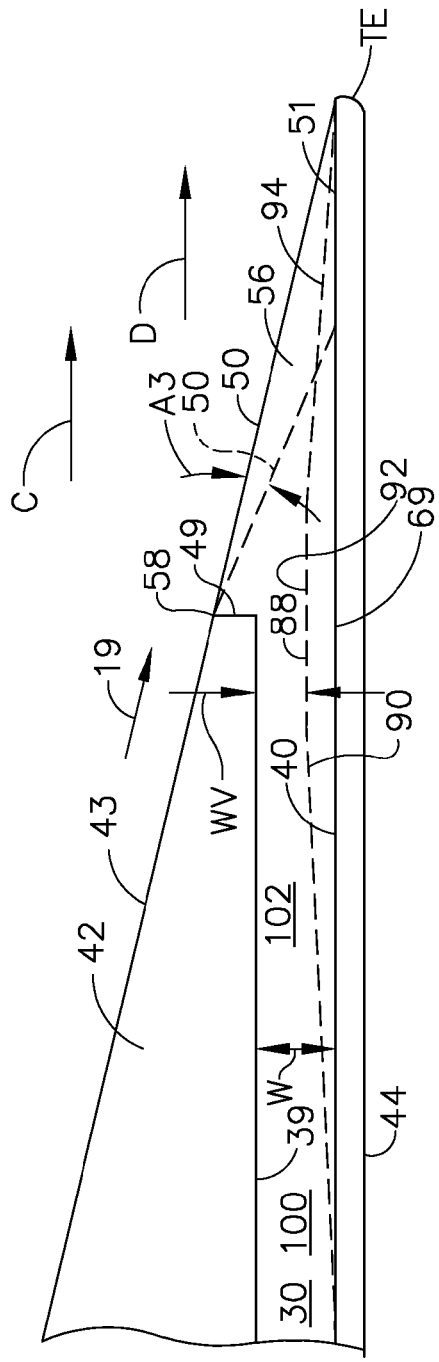
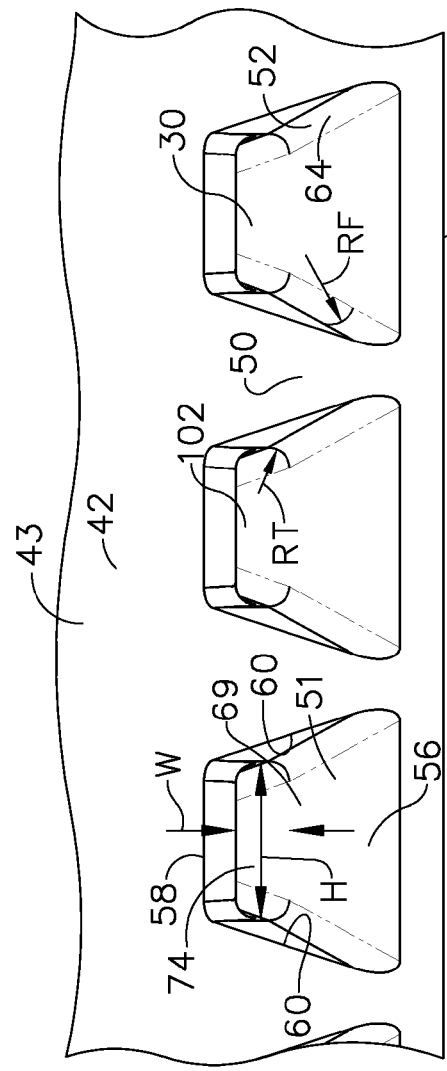
FIG. 4
FIG. 5

TURBINE AIRFOIL TRAILING EDGE COOLING SLOTS

BACKGROUND OF THE INVENTION

1. Field of the Invention

The present invention relates generally to gas turbine engine turbine airfoil cooling and, more specifically, to turbine airfoil trailing edge cooling slots.

2. Description of Related Art

In a gas turbine engine, air is pressurized in a compressor and mixed with fuel in a combustor for generating hot combustion gases. The hot gases are channeled through various stages of a turbine which extract energy therefrom for powering the compressor and producing work, such as powering an upstream fan in a typical aircraft turbofan engine application.

The turbine stages include stationary turbine nozzles having a row of hollow vanes which channel the combustion gases into a corresponding row of rotor blades extending radially outwardly from a supporting rotor disk. The vanes and blades have corresponding hollow airfoils with corresponding cooling circuits therein.

The cooling air is typically compressor discharge air which is diverted from the combustion process and, therefore, decreases overall efficiency of the engine. The amount of cooling air must be minimized for maximizing the efficiency of the engine, but sufficient cooling air must nevertheless be used for adequately cooling the turbine airfoils for maximizing their useful life during operation. Each airfoil includes a generally concave pressure sidewall and, an opposite, generally convex suction sidewall extending longitudinally or radially outwardly along a span from an airfoil base to an airfoil tip and axially in chordwise direction between leading and trailing edges. For a turbine blade, the airfoil span extends from a root at the radially inner platform to a radially outer tip spaced from a surrounding turbine shroud. For a turbine vane, the airfoil extends from a root integral with a radially inner band to a radially outer tip integral with an outer band.

Each turbine airfoil also initially increases in thickness aft of the leading edge and then decreases in thickness to a relatively thin or sharp trailing edge where the pressure and suction sidewalls join together. The wider portion of the airfoil has sufficient internal space for accommodating various forms of internal cooling circuits and turbulators for enhancing heat transfer cooling inside the airfoil, whereas, the relatively thin trailing edge has correspondingly limited internal cooling space.

Each airfoil typically includes various rows of film cooling holes extending through the sidewalls thereof which discharge the spent cooling air from the internal circuits. The film cooling holes are typically inclined in the aft direction toward the trailing edge and create a thin film of cooling air over the external surface of the airfoil that provides a thermally insulating air blanket for additional protection against the hot combustion gases which flow over the airfoil surfaces during operation.

The thin trailing edge is typically protected by a row of trailing edge cooling slots which breach the pressure sidewall at a breakout immediately upstream of the trailing edge for discharging film cooling air thereover. Each trailing edge cooling slot has an outlet aperture in the pressure side which begins at a breakout and may or may not be bounded in the radial direction by exposed lands at aft ends of axially extending partitions which define the cooling slots.

The axial partitions may be integrally formed with the pressure and suction sides of the airfoil and themselves must be cooled by the air discharged through the cooling slots defined thereby. The partitions typically converge in the aft direction toward the trailing edge so that the cooling slots diverge toward the trailing edge with a shallow divergence angle that promotes diffusion of the discharged cooling air with little if any flow separation along the sides of the partitions.

Aerodynamic and cooling performance of the trailing edge cooling slots is directly related to the specific configuration of the cooling slots and the intervening partitions. The flow area of the cooling slots regulates the flow of cooling air discharged through the cooling slots, and the geometry of the cooling slots affects cooling performance thereof.

The divergence or diffusion angle of the cooling slots can effect undesirable flow separation of the discharged cooling air which would degrade performance and cooling effectiveness of the discharged air. This also increases losses that impact turbine efficiency. Portions of the thin trailing edge directly under the individual cooling slots are effectively cooled by the discharged cooling air, with the discharged air also being distributed over the intervening exposed lands at the aft end of the partitions. The lands are solid portions of the pressure sidewall integrally formed with the suction sidewall and must rely for cooling on the air discharged from the adjacent trailing edge cooling slots.

Notwithstanding, the small size of the these outlet lands and the substantial cooling performance of the trailing edge cooling slots, the thin trailing edges of turbine airfoils nevertheless typically limit the life of those airfoils due to the high operating temperature thereof in the hostile environment of a gas turbine engine.

Accordingly, it is desired to provide a turbine airfoil having improved trailing edge cooling and cooling slots for improving airfoil durability and engine performance. It is also desired to minimize the amount of cooling flow used for trailing edge cooling in order to maximize fuel efficiency of the turbine and the engine.

SUMMARY OF THE INVENTION

A gas turbine engine turbine airfoil includes widthwise spaced apart pressure and suction sidewalls extending outwardly along a span from an airfoil base to an airfoil tip and extending chordwise between opposite leading and trailing edges. A spanwise row of spanwise spaced apart trailing edge cooling holes encased in the pressure sidewall end at corresponding spanwise spaced apart trailing edge cooling slots extending chordally substantially to the trailing edge. The cooling hole includes in downstream serial cooling flow relationship, a curved inlet, a constant area and constant width flow cross section metering section, and a spanwise diverging section leading into the trailing edge cooling slot. A spanwise height is substantially greater than a hole width through the cooling hole.

The pressure and suction sidewalls include pressure and suction sidewall surfaces respectively in the hole and the pressure sidewall surface may be planar through the entire metering and diverging sections. The width may be constant through the metering and diverging sections of the hole.

Lands may be disposed between spanwise adjacent ones of the trailing edge cooling slots and slot floors may be disposed in the trailing edge cooling slots between the lands. The lands may be coplanar or flush with an external surface of the pressure sidewall around each of the cooling slots.

The diverging section may have a race track shaped flow cross section. The race track shaped flow cross section includes a rectangular section between spanwise spaced apart rounded or semi-circular inner and outer end sections having corner radii. Fillets having fillet radii are in slot corners between the lands and the slot floors and the fillet radii are substantially the same size as the corner radii of the flow cross section.

The inlet may be downstream converging or bellmouth shaped.

At least one of the cooling holes may include a raised floor extending downstream through each of the diverging section starting at the end of the metering section and into and at least partially through the cooling slot. The raised floor includes in downstream serial relationship a flat or curved up ramp in the diverging section, a flat or curved down ramp in the trailing edge cooling slot, and a transition section between the up and down ramps. The up ramp ramps up and extends downstream from the suction sidewall surface at the end of the metering section. The down ramp ramps down and extends downstream from the transition section to the trailing edge.

The lands may be angled towards the slot floor and away from the external surface of the pressure sidewall and the lands and intercept the slot floor upstream of the trailing edge.

BRIEF DESCRIPTION OF THE DRAWINGS

The foregoing aspects and other features of the invention are explained in the following description, taken in connection with the accompanying drawings where:

FIG. 4 is a cross sectional schematical view of the trailing edge cooling slots and the cooling holes taken through 4-4 in FIG. 3.

FIG. 5 is an upstream looking perspective view of the trailing edge cooling slots illustrated in FIG. 3.

DETAILED DESCRIPTION OF THE INVENTION

Figure 1:
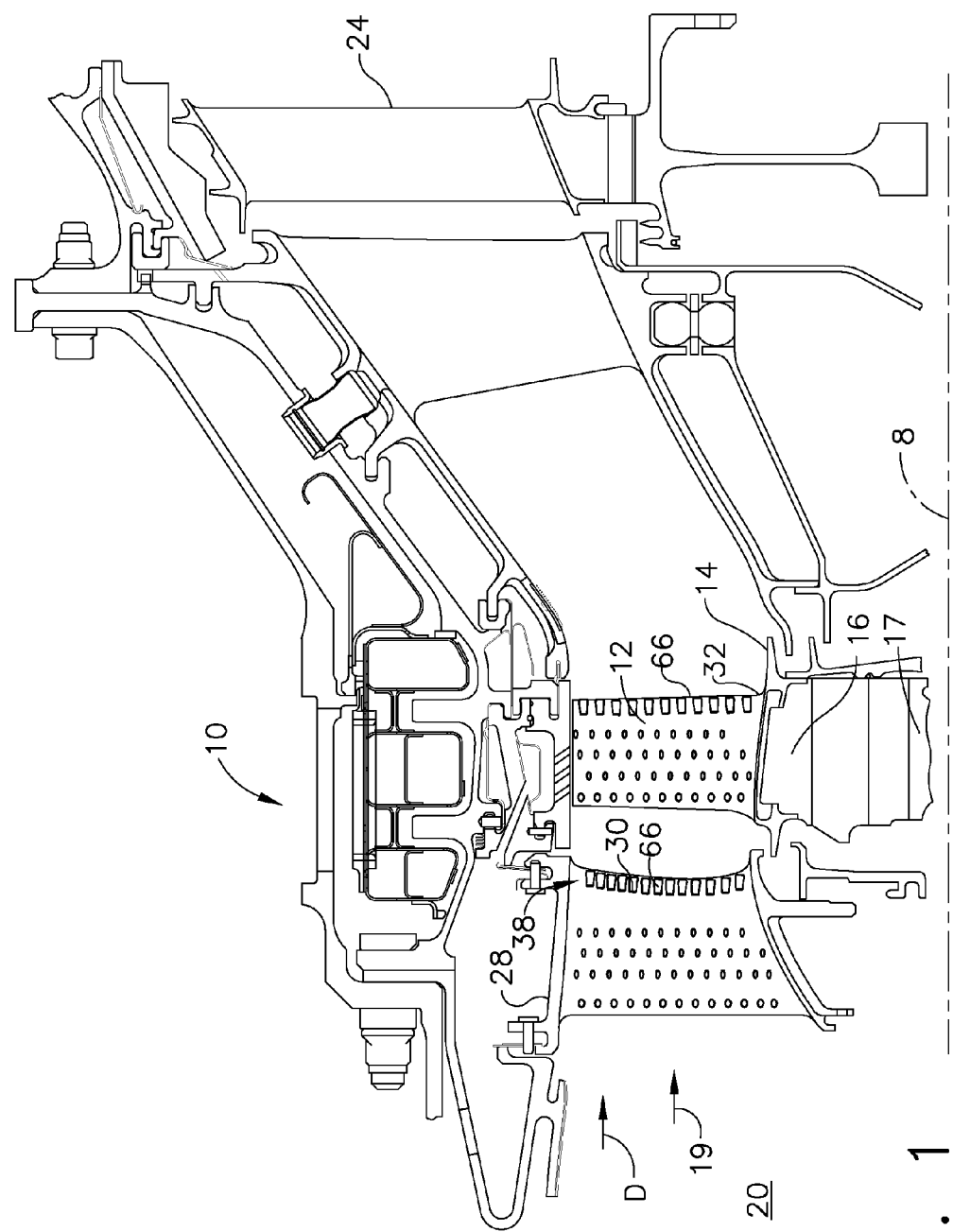
FIG. 1 is a longitudinal, sectional view illustration of an exemplary embodiment of turbine vane and rotor blade airfoils having cooling holes culminating at spanwise spaced apart trailing edge cooling slots.

Illustrated in FIG. 1 is an exemplary gas turbine engine high pressure turbine stage 10 circumscribed about an engine centerline axis 8 and positioned between a combustor 20 and a low pressure turbine (LPT) 24. The combustor 20 mixes fuel with pressurized air for generating hot combustion gases 19 which flows downstream through the turbines.

The high pressure turbine stage 10 includes a turbine nozzle 28 upstream of a high pressure turbine (HPT) 22 through which the hot combustion gases 19 are discharged into from the combustor 20. The exemplary embodiment of the high pressure turbine 22 illustrated herein includes at least one row of circumferentially spaced apart high pressure turbine blades 32. Each of the turbine blades 32 includes a turbine airfoil 12 integrally formed with a platform 14 and an axial entry dovetail 16 used to mount the turbine blade on a perimeter of a supporting rotor disk 17.

Figure 2:
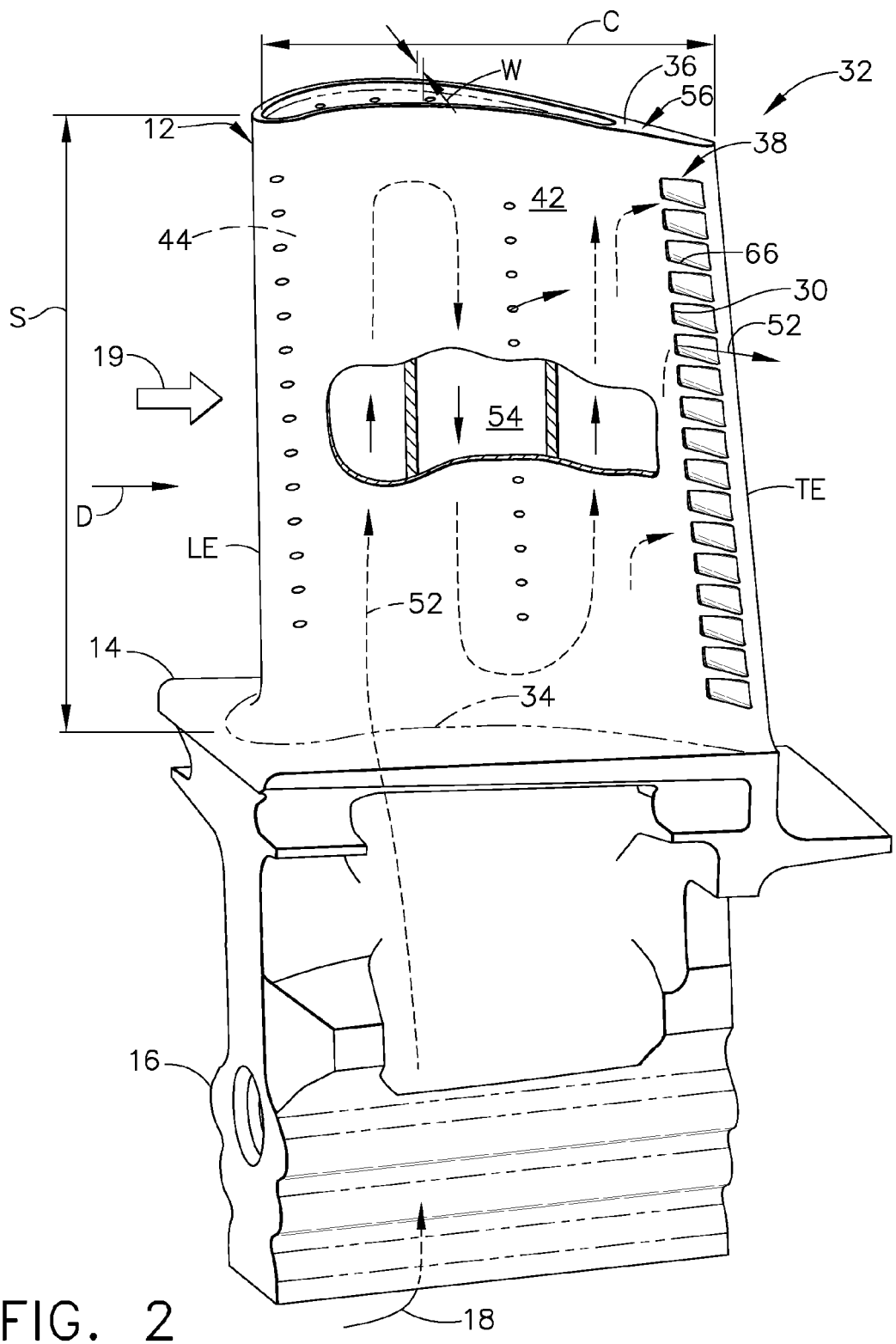
FIG. 2 is an enlarged view of a blade illustrated in FIG. 1.

Referring to FIG. 2, the airfoil 12 extends radially outwardly along a span S from an airfoil base 34 on the blade platform 14 to an airfoil tip 36. During operation, the hot combustion gases 19 are generated in the engine and flow downstream over the turbine airfoil 12 which extracts energy therefrom for rotating the disk supporting the blade for powering the compressor (not shown). A portion of pressurized air 18 is suitably cooled and flowed to the blade for cooling thereof during operation.

The airfoil 12 includes widthwise spaced apart generally concave pressure and convex suction sidewalls 42 and 44. The pressure and suction sidewalls 42, 44 extend longitudinally or radially outwardly along the span S from the airfoil base 34 to the airfoil tip 36. The sidewalls also extend axially in a chordwise direction C between opposite leading and trailing edges LE, TE. The airfoil 12 is hollow with the pressure and suction sidewalls 42, 44 being spaced widthwise or laterally apart between the leading and trailing edges LE, TE to define an internal cooling cavity or circuit 54 therein for circulating pressurized cooling air or coolant flow 52 during operation. The pressurized cooling air or coolant flow 52 is from the portion of pressurized air 18 diverted from the compressor.

The turbine airfoil 12 increases in width W or widthwise from the leading edge LE to a maximum width aft therefrom and then converges to a relatively thin or sharp trailing edge TE. The size of the internal cooling circuit 54 therefore varies with the width W of the airfoil, and is relatively thin immediately forward of the trailing edge where the two sidewalls integrally join together and form a thin trailing edge portion 56 of the airfoil 12. Spanwise spaced apart trailing edge cooling slots 66 are provided at or near this thin trailing edge portion 56 of the airfoil 12 to cool it.

Figure 3:
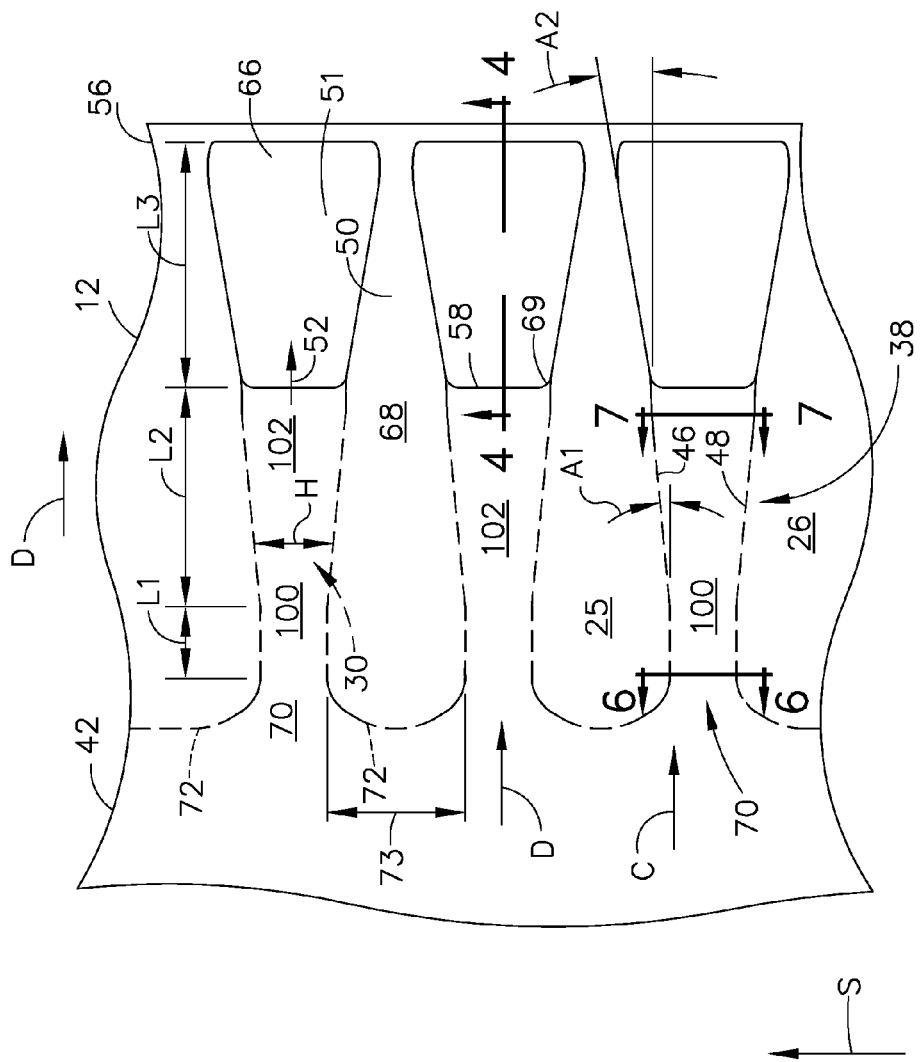
FIG. 3 is a pressure side sectional view of cooling holes with a constant width metering section and a diffusing section leading into the trailing edge cooling slots illustrated in FIG. 2.

Referring to FIG. 3, a row 38 of spanwise spaced apart trailing edge cooling holes 30 encased or buried and formed in the pressure sidewall 42 at corresponding ones of the spanwise spaced apart trailing edge cooling slots 66.

The trailing edge cooling slots 66 extend chordally substantially to the trailing edge TE. The trailing edge cooling holes 30 are disposed along the span S of the trailing edge TE in flow communication with the internal cooling circuit 54 for discharging the coolant flow 52 therefrom during operation.

The trailing edge cooling holes 30 are illustrated in more particularity in FIG. 3. Each cooling hole 30 includes in downstream serial cooling flow relationship, a downstream converging or bellmouth shaped curved inlet 70, a constant area and constant width flow cross section metering section 100, and a spanwise diverging section 102 which leads into the trailing edge cooling slot 66 and supplies the slot with cooling air or coolant flow 52. The trailing edge cooling slot 66 begins at a breakout 58 at a downstream end 69 of the diverging section 102 and the embodiment illustrated herein spanwise diverges. The cooling holes 30 are separated radially along the span S from each other by corresponding axial partitions 68 which extend downstream toward the trailing edge TE. The curved inlet 70 is illustrated herein as downstream converging or, more particularly, a bellmouth inlet.

The inlet 70 is defined at and between forward ends 72 of the partitions 68. The partitions 68 include semi-circular forward ends 72 having diameters 73 that define the bellmouth inlet 70. Each of the cooling holes 30 includes spanwise spaced apart upper and lower hole surfaces 46, 48 along a corresponding adjacent pair of upper and lower ones 25, 26 of the axial partitions 68. A spanwise height H of the hole 30 is defined between the upper and lower hole surfaces 46, 48 of the upper and lower ones 25, 26 of the axial partitions 68 as illustrated in FIG. 3.

Referring to FIGS. 3-5, a hole width W of the hole 30 is defined between pressure and suction sidewall surfaces 39, 40 of the pressure and suction sidewalls 42, 44 respectively in the hole 30 as illustrated in FIG. 4. The trailing edge cooling slots 66 include a slot floor 51 open and exposed to the hot combustion gases 19 that pass through the high pressure turbine 22. The slot floor 51 extends for the entire third length L3 along the suction sidewall 44.

Figure 6:
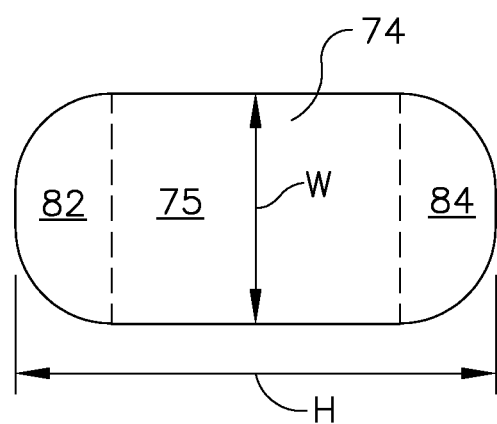
FIG. 6 is a cross sectional schematical view of an elongated flow cross section in the constant width metering section taken through 6-6 in FIG. 3.
Figure 7:
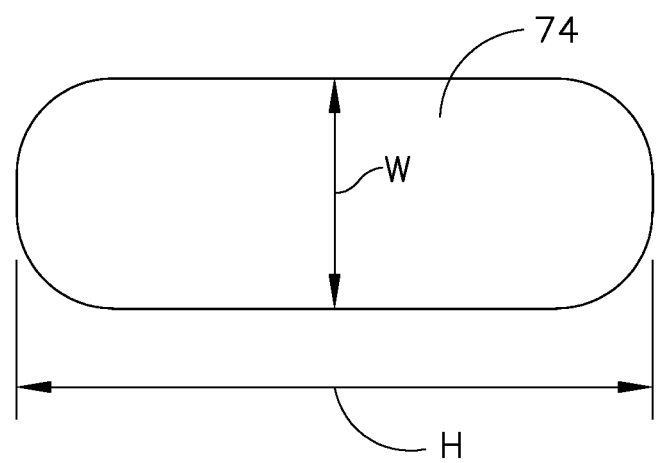
FIG. 7 is a cross sectional schematical view of an elongated flow cross section in the diffusing section taken through 7-7 in FIG. 3.

The adjacent pair of upper and lower ones 25, 26 of the axial partitions 68 and the pressure and suction sidewalls 42, 44 spanwise bound the hole 30. Referring to FIGS. 6 and 7, the cooling hole 30 has a generally spanwise elongated flow cross section 74 and the spanwise height H is substantially greater than the hole width W. The cooling hole 30 has a height to width ratio H/W in a range of about 2:1 to 10:1 (see FIGS. 4-10). The pressure and suction sidewall surfaces 39, 40 of the pressure and suction sidewalls 42, 44 respectively widthwise bound the hole 30. The metering section 100, the diverging section 102, and the trailing edge cooling slot 66 have downstream extending first, second, and third lengths L1, L2, and L3 respectively as illustrated in FIG. 3.

The embodiment of the cooling hole 30 illustrated in FIG. 4 has a fixed or constant width W through the cooling hole 30 and the pressure and suction sidewall surfaces 39, 40 are parallel through the entire first and second lengths L1, L2 of the cooling hole 30. The pressure sidewall surface 39 is flat or planar through the entire metering and diverging sections 100, 102 and their corresponding first and second lengths L1, L2 of the cooling hole 30. In this embodiment of the cooling hole 30 the suction sidewall surface 40 is flat or planar through the entire metering and diverging sections 100, 102 and their corresponding first and second lengths L1, L2 of the cooling hole 30. The slot floor 51 is coplanar with suction sidewall surface 40 in the hole 30. The inlet 70, the metering section 100, and the diverging section 102 have the same hole width W, or are of constant width W, in the embodiment of the trailing edge cooling holes 30 illustrated in FIG. 3 and schematically illustrated in solid line in FIG. 4. The diverging section 102 diverges in a spanwise direction.

The diverging sections 102 of the cooling holes 30 lead into the trailing edge cooling slots 66 which breach the external surface 43 of the pressure sidewall 42 at a breakout lip 49 spaced forward or upstream from the trailing edge TE. Each trailing edge cooling slot 66 is radially or spanwise bounded by exposed lands 50 forming the aft ends of the corresponding partitions 68, with the forward ends of the partitions extending forward or upstream toward the leading edge from the corresponding breakout lips 49. As illustrated in solid line in FIG. 4, the lands 50 are coplanar or flush with the external surface 43 of the pressure sidewall 42 around each of the exposed cooling slot 66, including the common breakout lip 49 extending radially therebetween. This maximizes flow continuity of the pressure side of the airfoil.

Slot surfaces 60 extend widthwise between the lands 50 and the slot floors 51. Fillets 62 in slot corners 64 between the lands 50 and the slot floors 51 have fillet radii RF that may be substantially the same size as bottom corner radii RT of the flow cross section 74 of the diverging sections 102 adjacent the bottom corner radii RT. The fillet radii RF helps with castability of the trailing edge cooling slots 66. The fillet radii RF helps improve cooling of the lands 50 by redistributing coolant flow 52 in the trailing edge cooling slots from the slot floor 51 to the lands 50 in order to make coolant flow 52 film coverage on the slot floors 51 and the lands 50 more uniformly.

Another embodiment of the lands 50 is illustrated in dashed line in FIG. 4 and provides for the lands 50 not being coplanar or flush with the external surface 43 of the pressure sidewall 42 around each of the exposed cooling slot 66. The lands 50 may be more angled towards the slot floor 51 and away from the external surface 43 of the pressure sidewall 42. The lands 50 may be angled away from the external surface 43 by a land angle A3 in a range between 0-5 degrees and the lands 50 may intercept the slot floor 51 upstream of the trailing edge TE.

Figure 9:
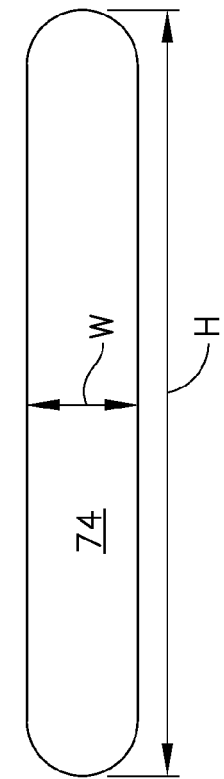
FIG. 9 is a cross sectional schematical view of an alternative race track shaped flow cross section with a larger width to height ratio than the race track shaped flow cross section illustrated in FIG. 8.
Figure 11:
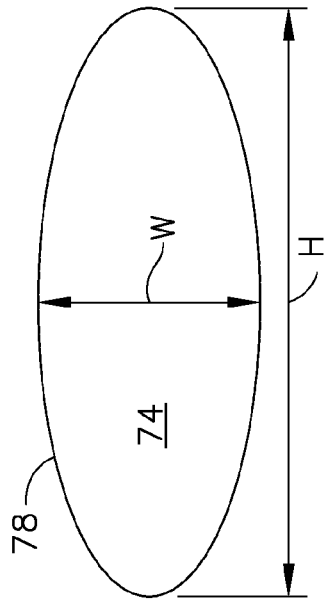
FIG. 11 is a cross sectional schematical view of another alternative flow cross section with in elongated and fully curved and includes curved quarter sides.
Figure 8:
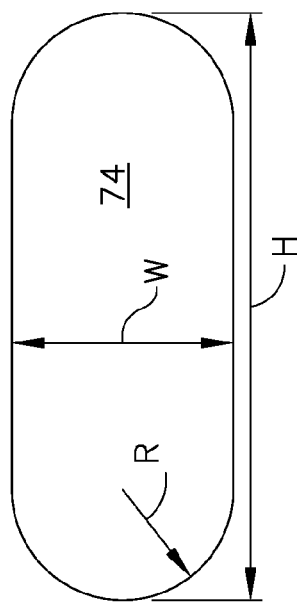
FIG. 8 is a cross sectional schematical view of a race track shaped flow cross section having four equal corner radii.
Figure 10:
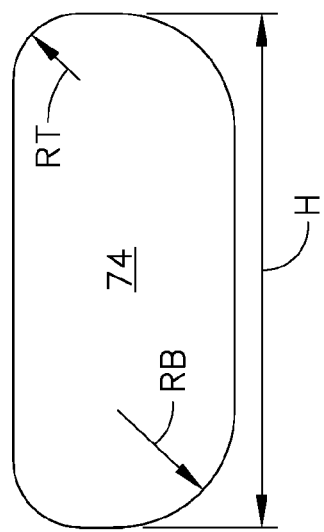
FIG. 10 is a cross sectional schematical view of an alternative flow cross section with unequal top and bottom corner radii.

The embodiment of the flow cross section 74 illustrated in FIGS. 3-6 has a race track shaped flow cross section 74 with the rectangular section 75 between spanwise or radially spaced apart rounded or semi-circular inner and outer end sections 82, 84. Four exemplary shapes suitable for the flow cross section 74 are illustrated in FIGS. 8-11. The race track shaped flow cross section 74 illustrated in FIG. 8 is spanwise elongated, has four equal corner radii R, and has a width to height ratio W/H in a range of 0.25-0.50. The race track shaped flow cross section 74 illustrated in FIG. 9 is spanwise elongated, has four equal corner radii R, and has a width to height ratio W/H in a range of 0.15-0.50. The race track shaped flow cross section 74 illustrated in FIG. 10 is similar to the one illustrated in FIG. 8 but has unequal top and bottom corner radii RB, RT radii R. An exemplary range of a corner ratio RB/RT is 1-3. The race track shaped flow cross section 74 illustrated in FIG. 11 is spanwise elongated and fully curved and includes curved quarter sides 78 that may be elliptical, parabolic, or polynomial blends.

The cooling holes 30, trailing edge cooling slots 66, and lands 50 are cast in cooling features. Casting these features provides good strength, low manufacturing costs, and durability for the airfoil and blades and vanes. The race track shaped flow cross section 74 with the rectangular section 75 between spanwise or radially spaced apart rounded or semi-circular inner and outer end sections 82, 84 provides good cooling flow characteristics which reduces the amount of the coolant flow 52 needed to cool the airfoils. The corner radii R contribute to good cooling, castability, and strength of these cooling features and in particular help cool the lands 50 thus reducing the amount of the coolant flow 52 used.

The embodiments of the cooling hole 30 and the trailing edge cooling slot 66 illustrated in FIGS. 3 and 5 includes a diverging trailing edge cooling slot 66. The diverging section 102 and the trailing edge cooling slot 66 may diverge at different first and second diverging angles A1, A2 as illustrated in FIG. 3. The spanwise height H of the diverging section 102 of the cooling hole 30 and the trailing edge cooling slot 66 increases in the downstream direction D. A more favorable flow angle relative to the lands for getting coolant flow 52 onto the lands at the breakout is set up by the expansion angle Al of the diverging section 102 of the slot, and the relative angle between the external diverging section 66, i.e., A2☐A1.

The spanwise elongated metering section 100 with the constant width W is sized to control the quantity of coolant flow 52 to benefit the engine cycle. The spanwise elongated metering section 100 and diverging section 102 expand the flow coverage at the breakout 58, redistributes coolant flow 52 in the trailing edge cooling slots from the slot floor 51 to the lands 50 in order to make coolant flow 52 film coverage on the slot floors 51 and the lands 50 more uniform. The constant width W metering section 100 upstream of the diverging section 102 of the hole 30 helps keep the coolant flow 52 fully attached in the diverging section 102.

This in turn allows an increase surface area of the slot floor 51 and decrease in surface area of the lands 50. The constant width W metering section 100 and diverging section 102 helps set up a more favorable flow angle at the breakout relative to the lands 50 to get more coolant flow 52 onto the lands. The planar pressure sidewall surface 39 through the entire first and second lengths L1, L2 of the cooling hole 30 also helps set up a more favorable flow angle at the breakout relative to the lands 50 to get more coolant flow 52 onto the lands. The constant width and separately the planar pressure sidewall surface 39 of the cooling hole 30 help keep the coolant flow 52 flow attached in the expansion section of the slot.

Another embodiment of the cooling hole 30 is illustrated in dashed line in FIG. 4 and provides for a variable width WV instead of a constant width W inside the diverging section 102 of the hole 30 between the pressure and suction sidewall surfaces 39, 40 of the pressure and suction sidewalls 42, 44 respectively. The variable width WV is provided by a raised floor 88 that extends downstream through the diverging section 102 starting at the end of the metering section 100 and into and at least partially through the cooling slot 66. The raised floor 88 includes in downstream serial relationship a flat or curved up ramp 90 in the diverging section 102, a flat or curved down ramp 94 in the trailing edge cooling slot 66, and a transition section 92 between the up and down ramps 90, 94.

Figure 12:
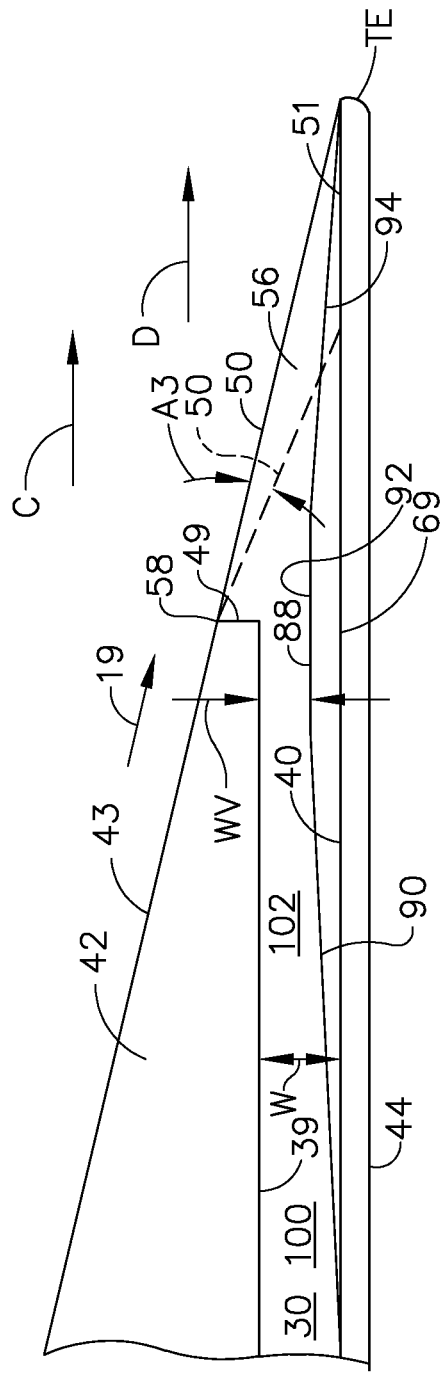
FIG. 12 is a cross sectional schematical view of curved up and down ramps of a raised floor in the cooling holes and the trailing edge cooling slots.

The flat up and down ramps 90, 94 are illustrated in FIG. 4 and the curved up and down ramps 90, 94 and curved transition section 92 are illustrated in FIG. 12. The up ramp 90 ramps up and extends downstream from the suction sidewall surface 40 at the end of the metering section 100. The down ramp 94 ramps down and extends downstream from the transition section 92 to the trailing edge TE. The transition section 92 may be flat or curved. The curved up and down ramps 90, 94 and the curved transition section 92 may be designed and constructed using Bezier splines.

This variable width WV diverging section 102 of the hole 30 helps keep the exit velocity of the coolant flow 52 and the gas velocity of the hot combustion gases along the external surface 43 of the pressure sidewall 42 at the breakout about equal to minimize aero losses and resultant negative effect on turbine efficiency.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as Defined and differentiated in the following claims:

The invention claimed is:

1. A gas turbine engine turbine airfoil comprising:
widthwise spaced apart pressure and suction sidewalls extending outwardly along a span from an airfoil base to an airfoil tip;
the pressure and suction sidewalls extending chordwise between opposite leading and trailing edges;
a spanwise row of spanwise spaced apart trailing edge cooling holes encased in the pressure sidewall and ending at corresponding spanwise spaced apart trailing edge cooling slots extending chordally substantially to the trailing edge;
the cooling hole including in downstream serial cooling flow relationship, a curved inlet, a metering section with a constant area and constant width flow cross section, and a spanwise diverging section leading into the trailing edge cooling slot; and
a spanwise height substantially greater than a hole width through the cooling hole;
at least one of the cooling holes including a raised floor extending downstream through each of the diverging sections starting at the end of the corresponding metering section and into and at least partially through the corresponding cooling slot;
the raised floor including in downstream serial relationship a flat up ramp in the diverging section, a flat down ramp in the trailing edge cooling slot, and a transition section between the up and down ramps;
the up ramp ramping up and extending downstream from the suction sidewall surface at the end of the metering section; and
the down ramp ramping down and extending downstream from the transition section to the trailing edge.

2. The airfoil as claimed in claim 1 further comprising pressure and suction sidewall surfaces of the pressure and suction sidewalls respectively in the hole and the pressure sidewall surface being planar through the entire metering and diverging sections.

3. The airfoil as claimed in claim 2 further comprising the width being constant through the metering and diverging sections of the hole.

4. The airfoil as claimed in claim 3 further comprising lands disposed between spanwise adjacent ones of the trailing edge cooling slots and slot floors in the trailing edge cooling slots between the lands.

5. The airfoil as claimed in claim 4 further comprising the lands being coplanar or flush with an external surface of the pressure sidewall around each of the cooling slots.

6. The airfoil as claimed in claim 4 further comprising:
the diverging section having a race track shaped flow cross section,
the race track shaped flow cross section including a rectangular section between spanwise spaced apart rounded or semi-circular inner and outer end sections,
the race track shaped flow cross section including a rectangular section between spanwise spaced apart rounded or semi-circular inner and outer end sections having corner radii,
fillets in slot corners between the lands and the slot floors, and
the fillets having fillet radii substantially the same size as the corner radii of the flow cross section.

7. The airfoil as claimed in claim 4 further comprising the diverging section and the trailing edge cooling slot diverging at different first and second diverging angles respectively.

8. The airfoil as claimed in claim 7 further comprising the lands being coplanar or flush with an external surface of the pressure sidewall around each of the cooling slots.

9. The airfoil as claimed in claim 7 further comprising:
the diverging section having a race track shaped flow cross section,
the race track shaped flow cross section including a rectangular section between spanwise spaced apart rounded or semi-circular inner and outer end sections having corner radii,
fillets in slot corners between the lands and the slot floors, and
the fillets having fillet radii substantially the same size as the corner radii of the flow cross section.

10. The airfoil as claimed in claim 1 further comprising the metering and diverging sections having a hole height to hole width ratio of the spanwise height and the hole width in a range of about 2:1 to 10:1.

11. The airfoil as claimed in claim 10 further comprising pressure and suction sidewall surfaces of the pressure and suction sidewalls respectively in the hole and the pressure sidewall surface being planar through the entire metering and diverging sections.

12. The airfoil as claimed in claim 11 further comprising the width being constant through the metering and diverging sections of the hole.

13. The airfoil as claimed in claim 12 further comprising lands disposed between spanwise adjacent ones of the trailing edge cooling slots and slot floors in the trailing edge cooling slots between the lands.

14. The airfoil as claimed in claim 13 further comprising the lands being coplanar or flush with an external surface of the pressure sidewall around each of the cooling slots.

15. The airfoil as claimed in claim 13 further comprising:
the diverging section having a race track shaped flow cross section,
the race track shaped flow cross section including a rectangular section between spanwise spaced apart rounded or semi-circular inner and outer end sections having corner radii,
fillets in slot corners between the lands and the slot floors, and
the fillets having fillet radii substantially the same size as the corner radii of the flow cross section.

16. The airfoil as claimed in claim 13 further comprising the diverging section and the trailing edge cooling slot diverging at different first and second diverging angles respectively.

17. The airfoil as claimed in claim 16 further comprising the lands being coplanar or flush with an external surface of the pressure sidewall around each of the cooling slots.

18. The airfoil as claimed in claim 16 further comprising:
the diverging section having a race track shaped flow cross section,
the race track shaped flow cross section including a rectangular section between spanwise spaced apart rounded or semi-circular inner and outer end sections having corner radii,
fillets in slot corners between the lands and the slot floors, and
the fillets having fillet radii substantially the same size as the corner radii of the flow cross section.

19. The airfoil as claimed in claim 13 further comprising the inlet being downstream converging or bellmouth shaped.

20. The airfoil as claimed in claim 19 further comprising the lands being coplanar or flush with an external surface of the pressure sidewall around each of the cooling slots.

21. The airfoil as claimed in claim 19 further comprising:
the diverging section having a race track shaped flow cross section,
the race track shaped flow cross section including a rectangular section between spanwise spaced apart rounded or semi-circular inner and outer end sections,
the inner and outer end sections including corner radii,
fillets in slot corners between the lands and the slot floors, and
the fillet radii being substantially the same size as the corner radii of the flow cross section.

22. The airfoil as claimed in claim 19 further comprising the diverging section and the trailing edge cooling slot diverging at different first and second diverging angles respectively.

23. The airfoil as claimed in claim 22 further comprising the lands being coplanar or flush with an external surface of the pressure sidewall around each of the cooling slots.

24. The airfoil as claimed in claim 22 further comprising:
the diverging section having a race track shaped flow cross section,
the race track shaped flow cross section including a rectangular section between spanwise spaced apart rounded or semi-circular inner and outer end sections,
the inner and outer end sections including corner radii,
fillets in slot corners between the lands and the slot floors, and
the fillet radii being substantially the same size as the corner radii of the flow cross section.

25. The airfoil as claimed in claim 1 further comprising lands disposed between spanwise adjacent ones of the trailing edge cooling slots and slot floors in the trailing edge cooling slots between the lands.

26. The airfoil as claimed in claim 25 further comprising the lands being coplanar or flush with an external surface of the pressure sidewall around each of the cooling slots.

27. The airfoil as claimed in claim 25 further comprising:
the diverging section having a race track shaped flow cross section,
the race track shaped flow cross section including a rectangular section between spanwise spaced apart rounded or semi-circular inner and outer end sections,
the inner and outer end sections including corner radii,
fillets in slot corners between the lands and the slot floors, and
the fillet radii being substantially the same size as the corner radii of the flow cross section.

28. The airfoil as claimed in claim 25 further comprising the diverging section and the trailing edge cooling slot diverging at different first and second diverging angles respectively.

29. The airfoil as claimed in claim 28 further comprising:
the diverging section having a race track shaped flow cross section,
the race track shaped flow cross section including a rectangular section between spanwise spaced apart rounded or semi-circular inner and outer end sections,
the inner and outer end sections including corner radii,
fillets in slot corners between the lands and the slot floors, and
the fillet radii being substantially the same size as the corner radii of the flow cross section.

30. The airfoil as claimed in claim 1 further comprising the metering and diverging sections having a hole height to hole width ratio of the spanwise height and the hole width in a range of about 2:1 to 10:1.

31. The airfoil as claimed in claim 30 further comprising pressure and suction sidewall surfaces of the pressure and suction sidewalls respectively in the hole and the pressure sidewall surface being planar through the entire metering and diverging sections.

32. The airfoil as claimed in claim 31 further comprising lands disposed between spanwise adjacent ones of the trailing edge cooling slots and slot floors in the trailing edge cooling slots between the lands.

33. The airfoil as claimed in claim 32 further comprising the diverging section and the trailing edge cooling slot diverging at different first and second diverging angles respectively.

34. The airfoil as claimed in claim 33 further comprising the inlet being downstream converging or bellmouth shaped.

35. The airfoil as claimed in claim 4 further comprising the lands angled towards the slot floor and away from an external surface of the pressure sidewall and the lands intercepting the slot floor upstream of the trailing edge.

36. The airfoil as claimed in claim 35 further comprising the lands angled away from the external surface by a land angle in a range between 0-5 degrees.

37. The airfoil as claimed in claim 36 further comprising the diverging section and the trailing edge cooling slot diverging at different first and second diverging angles respectively.

38. The airfoil as claimed in claim 35 further comprising:
the diverging section having a race track shaped flow cross section,
the race track shaped flow cross section including a rectangular section between spanwise spaced apart rounded or semi-circular inner and outer end sections having corner radii,
fillets in slot corners between the lands and the slot floors, and
the fillets having fillet radii substantially the same size as the corner radii of the flow cross section.

39. The airfoil as claimed in claim 35 further comprising the metering and diverging sections having a hole height to hole width ratio of the spanwise height and the hole width in a range of about 2:1 to 10:1.

40. The airfoil as claimed in claim 34 further comprising pressure and suction sidewall surfaces of the pressure and suction sidewalls respectively in the hole and the pressure sidewall surface being planar through the entire metering and diverging sections.

41. The airfoil as claimed in claim 40 further comprising the width being constant through the metering and diverging sections of the hole.

\* \* \* \* \*

UNITED STATES PATENT AND TRADEMARK OFFICE
CERTIFICATE OF CORRECTION

| | |
|---|---|
| PATENT NO. | : 9,175,569 B2 |
| APPLICATION NO. | : 13/435302 |
| DATED | : November 3, 2015 |
| INVENTOR(S) | : Bergholz, Jr. et al. |

It is certified that error appears in the above-identified patent and that said Letters Patent is hereby corrected as shown below:

IN THE SPECIFICATION

In Column 6, Lines 66-67, delete "section 66," and insert -- section 102, --, therefor.

Signed and Sealed this
Twenty-second Day of March, 2016

Michelle K. Lee
*Director of the United States Patent and Trademark Office*